No. 640,529. Patented Jan. 2, 1900.
C. BORG.
SERRATING MACHINE.
(Application filed Dec. 3, 1898.)
(No Model.) 5 Sheets—Sheet 1.

Witnesses
Marvin Cramer
F. A. Fulton

Inventor
Chris Borg.

No. 640,529. Patented Jan. 2, 1900.
C. BORG.
SERRATING MACHINE.
(Application filed Dec. 3, 1898.)
(No Model.) 5 Sheets—Sheet 2.

Witnesses
Inventor
Chris Borg

No. 640,529. Patented Jan. 2, 1900.
C. BORG.
SERRATING MACHINE.
(Application filed Dec. 3, 1898.)
(No Model.) 5 Sheets—Sheet 3.
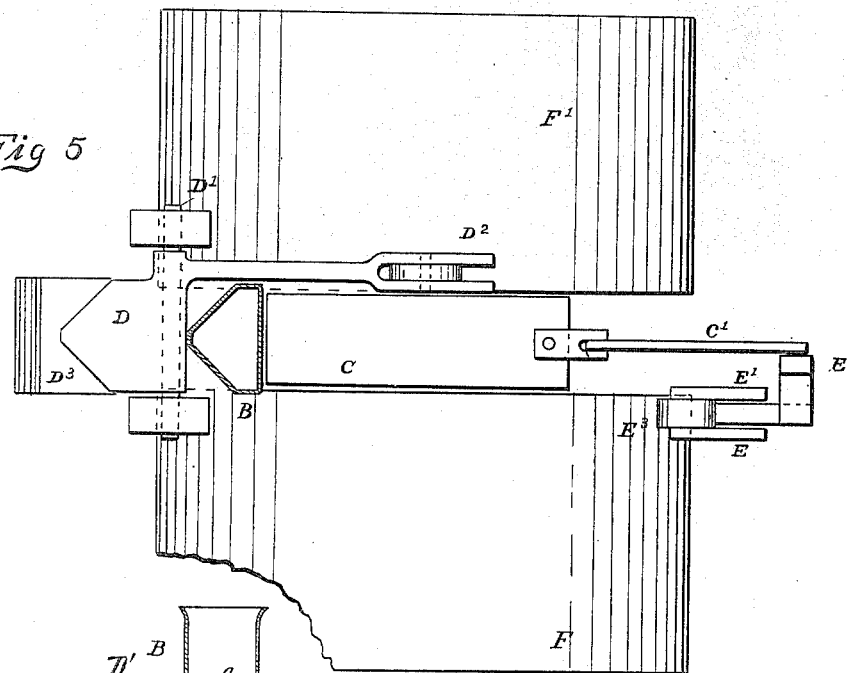
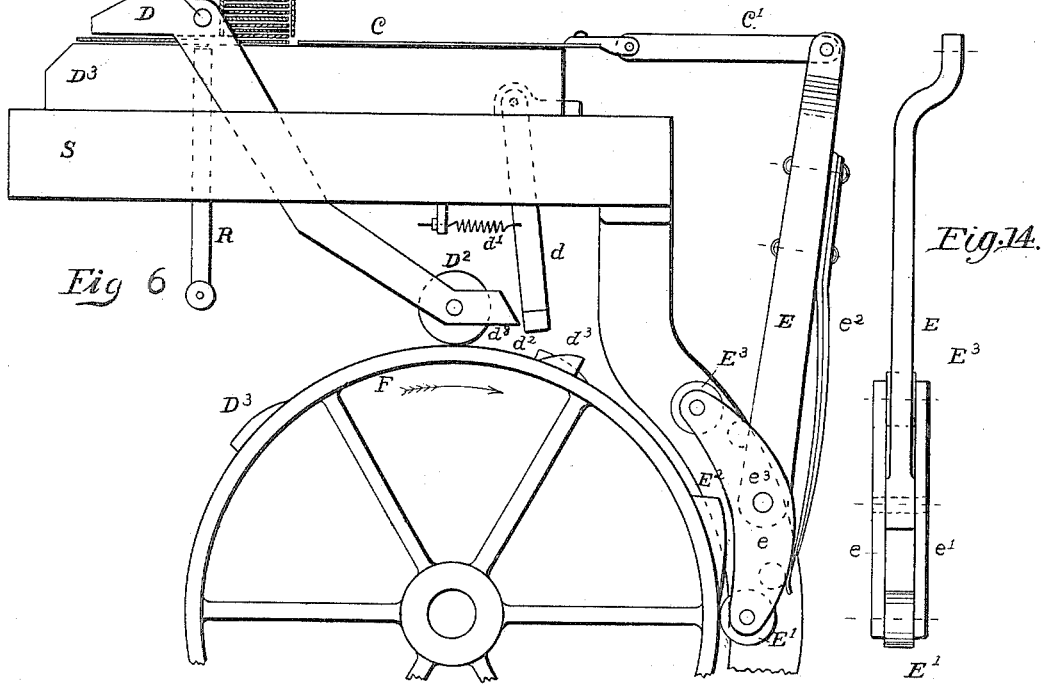
Witnesses
Marvin Cramer
F. A. Fulton
Inventor
Chris Borg No. 640,529. Patented Jan. 2, 1900.
C. BORG.
SERRATING MACHINE.
(Application filed Dec. 3, 1898.)
(No Model.) 5 Sheets—Sheet 4.
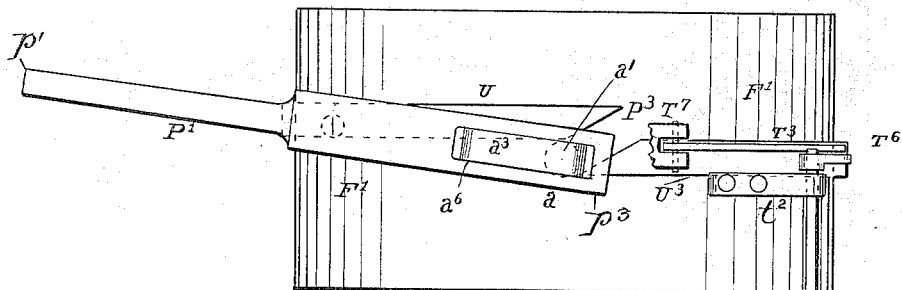
Fig 7
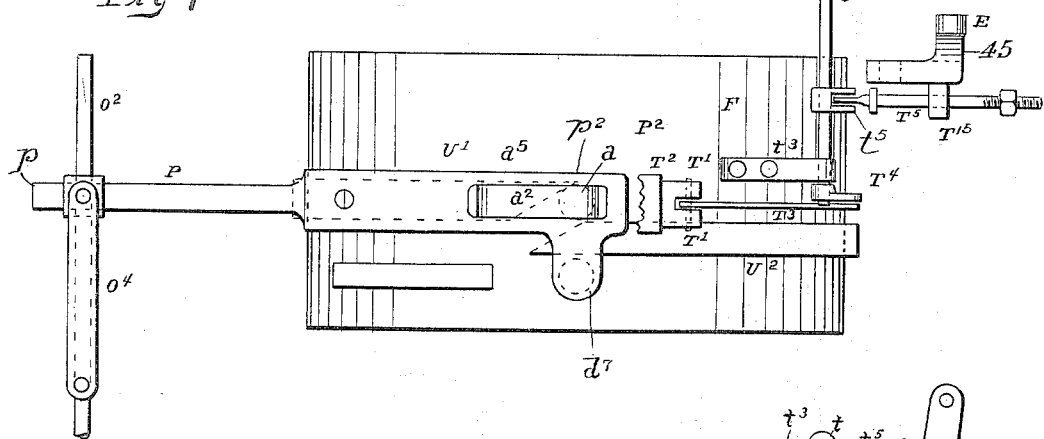
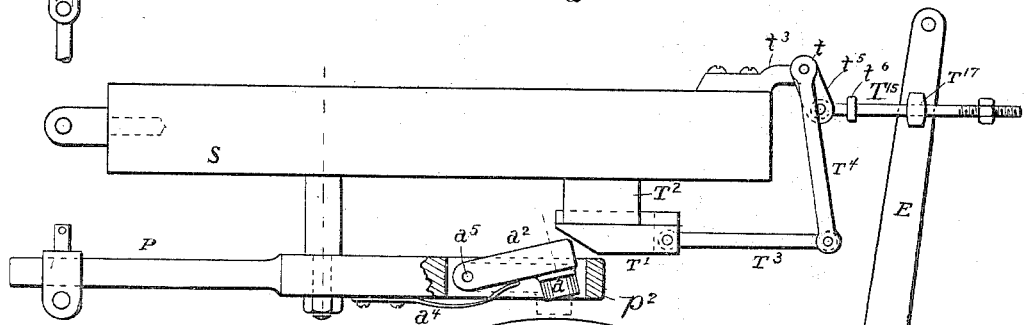
Fig 8
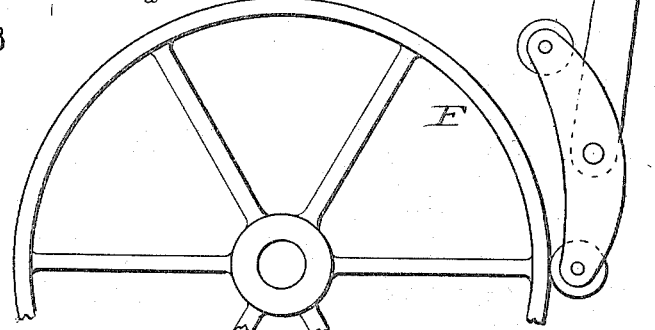
Witnesses
Marvin Cramer
F. A. Fulton
Inventor
Chris Borg No. 640,529. Patented Jan. 2, 1900.
C. BORG.
SERRATING MACHINE.
(Application filed Dec. 3, 1898.)
(No Model.) 5 Sheets—Sheet 5.
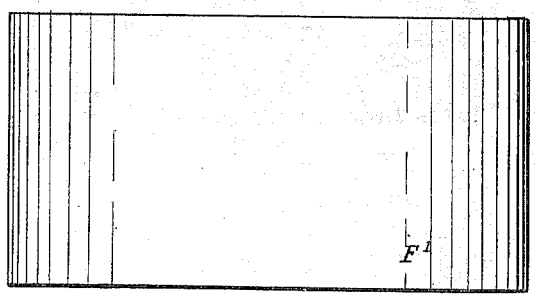
Fig. 9
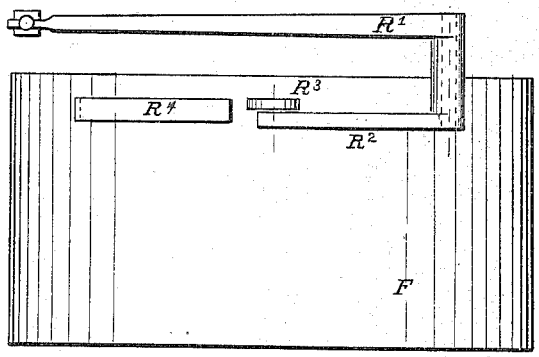
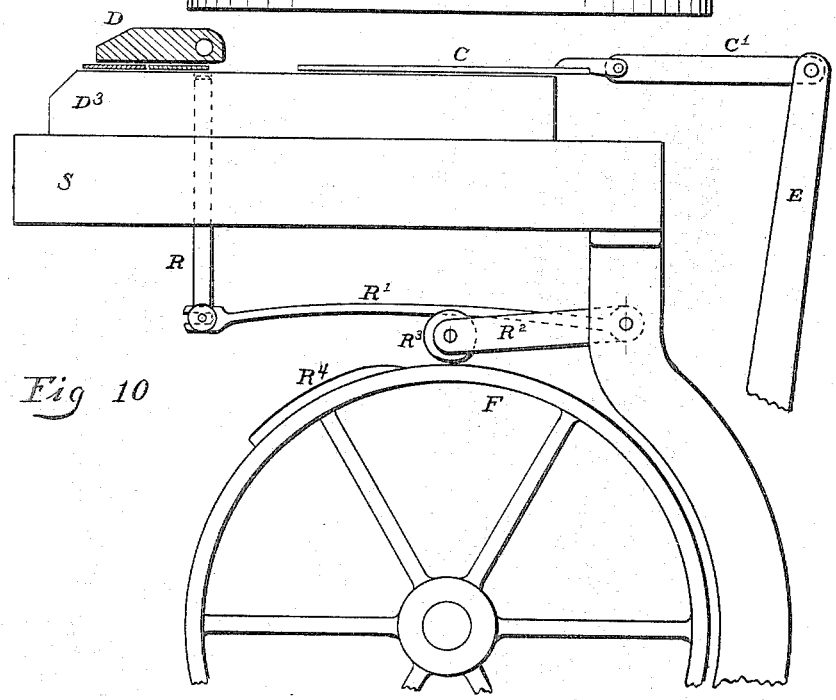
Fig. 10
Witnesses
Marvin Cramer
F. A. Fulton
Inventor
Chris Borg

UNITED STATES PATENT OFFICE.

CHRIS BORG, OF CHICAGO, ILLINOIS, ASSIGNOR TO THE DEERING HARVESTER COMPANY, OF SAME PLACE.

SERRATING-MACHINE.

SPECIFICATION forming part of Letters Patent No. 640,529, dated January 2, 1900.

Application filed December 3, 1898. Serial No. 698,236. (No model.)

*To all whom it may concern:*

Be it known that I, CHRIS BORG, of Chicago, in the county of Cook and State of Illinois, have invented certain new and useful Improvements in Serrating-Machines, of which the following is a full description, reference being had to the accompanying drawings, in which—

Figure 1:
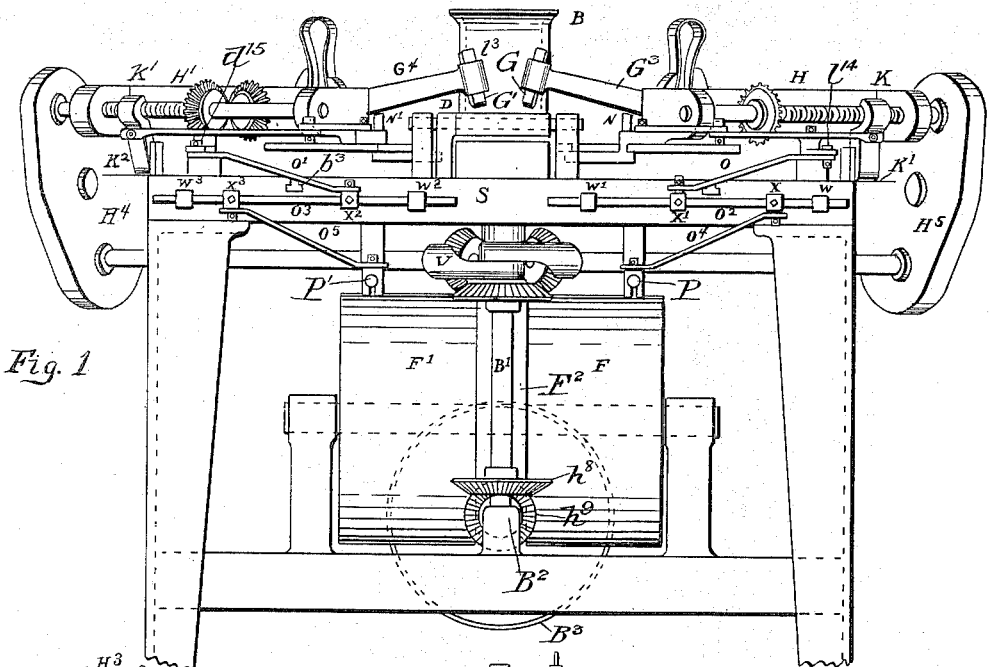
Figure 2:
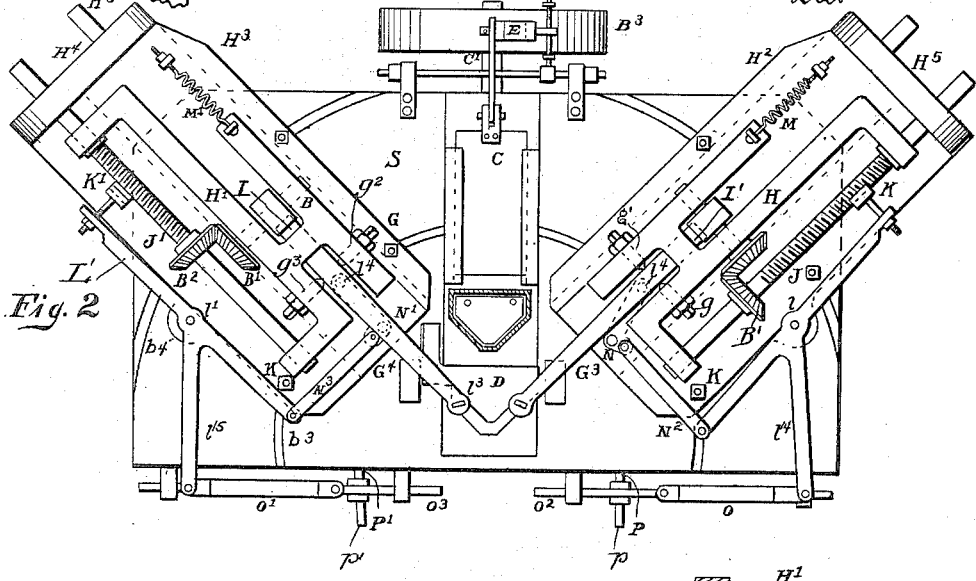
Figure 13:
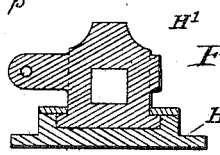
Figure 3:
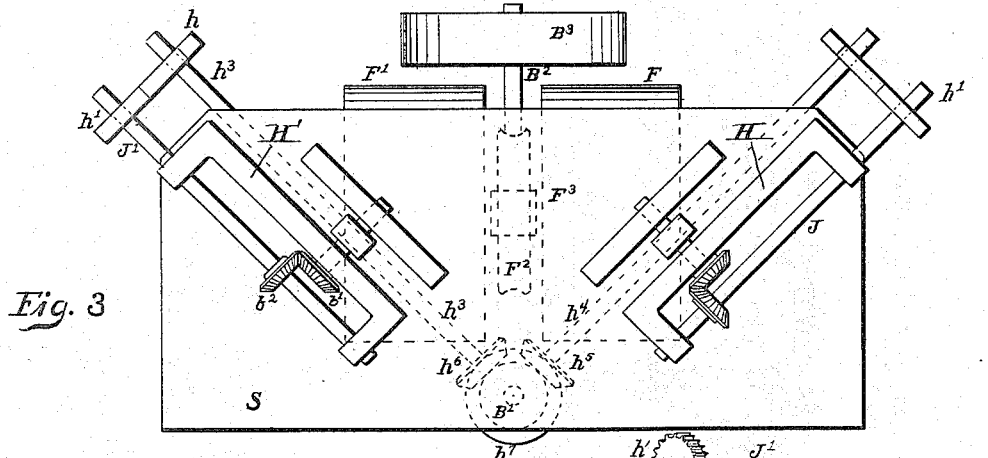
Figure 11:
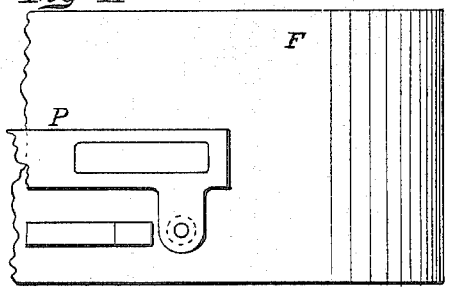
Figure 12:
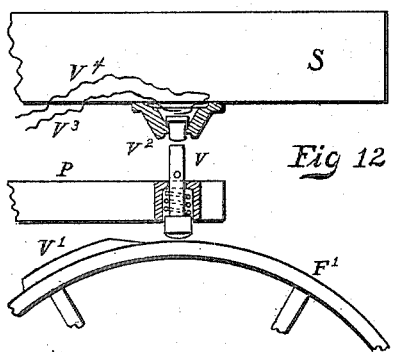
Figure 4:
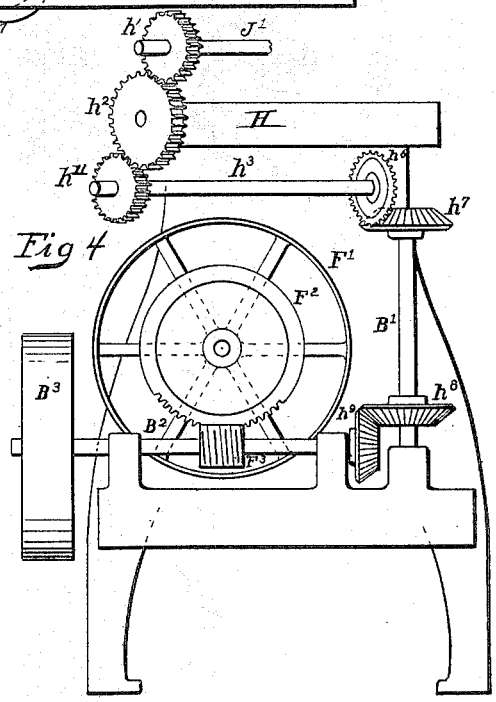

Figure 1 is a front side elevation of a machine embodying my invention adapted to serrate sections used in the cutting apparatus of harvesting-machines. Fig. 2 is a plan view of such parts as are necessary to understand a portion of the details of my invention. Fig. 3 is designed to show the relative location of the serrating devices and to aid in connection with other figures in showing the manner in which they are made adjustable, so that the line of travel of the serrating-hammers may be shifted to correspond to the angle of the edges of such sections as it is desired to serrate. Fig. 4 is a right-hand side elevation of my machine or, as it may be expressed, the side of the machine that is at the left of the operator when he is facing it. Fig. 5 is a plan view of the hopper, in which the sections are located above the anvil, upon the face of which they are secured while being serrated, the slide which forces the sections from the hopper to the forward part of the anvil, and the clamp for securing such sections to the anvil while being serrated. Fig. 6 is a side elevation showing the same parts and the cams and levers for making the slide and clamp operative. Fig. 7 are details showing the mechanism used for stopping and starting the action of the serrating-hammers. Fig. 8 shows the mechanism provided for throwing the hammers out of action when the supply of sections in the hopper becomes exhausted. Figs. 9 and 10 show in detail the mechanism provided for maintaining the serrating-hammers in inactive positions whenever there are no sections in position to be operated upon. Figs. 11 and 12 show the device provided for ringing a signal-bell when the hopper becomes exhausted in order to call the attention of the attendant to the fact. Fig. 13 is a sectional view of the hammer bed-plate and the serrating-hammer carriage. Fig. 14 is a detail view of the lever and its connections for actuating the feed-slide.

Heretofore machines for performing the work my machine is intended to accomplish have been so constructed as to require the operator to place the sections to be serrated into the machine by hand consecutively, the function of holding, starting the serrating-hammers, stopping the same, and releasing and ejecting the knives from the machine being performed solely by the operator. With my improvement the necessary functions are performed automatically, it only being necessary to supply the hopper with sections to be operated upon.

The automatic feeding mechanism will be best understood by reference to Figs. 5, 6, and 14, where A is a pile of sections resting in the hopper B above the anvil $D^3$. The lower edges of the hopper B are high enough above the surface of the anvil $D^3$ to permit the lower section only to be moved from the bottom of the pile and carried to its position for being serrated, as shown in Fig. 6.

C is a slide suitably guided at its edges and adapted to be thrust beneath the edges of the hopper B and engage the lowermost section and force it to position for being serrated.

E is a lever pivoted at $e^3$ to a stationary part of the main framework. Connected to the lever E are plates $e$ and $e'$, which are pivoted to the lever at $e^3$ and lie each side of it and are provided at their ends, which are above and below the fulcrum of the lever, with antifriction-rollers $E'$ and $E^3$.

The plates $e$ and $e'$ may be considered as part of the lever E; but for reasons that will be explained they are not rigidly connected thereto. On the contrary, they are elastically connected by means of the spring $e^2$. When the machine is operating and sections are in the hopper, these parts rock on the fulcrum $e^3$ as one piece with the lever E.

F and F' are cam-wheels located beneath the bed of the machine and adapted to actuate various moving parts through the lever E, which is rocked in both directions by the cam F. The cam-wheel rotating in the direction indicated by the arrow, Fig. 6, the cam $E^2$ first strikes the roller $E^3$ and draws the slide C, connected thereto by the link $C'$, from beneath the hopper. Further movement of the cam E² causes it to strike the roller E', which forces the slide in a reverse direction. When the slide C is drawn from beneath the hopper, the sections therein fall upon the part of the anvil that is immediately below, and as the slide is moved in the reverse direction the lower one is forced to position to be serrated. In order that the sections may be securely clamped on the anvil, I provide a jaw D, pivoted on the strong pin D'. The jaw is, in fact, a lever, the long arm of which extends downwardly and backward, as shown in Fig. 6, and is provided with an antifriction-roller, beneath which the cam on the cam-wheel F passes and lifts it, thus forcing the jaw down onto the section to be held.

$d$ is a latch adapted to catch under the inclined end of the lever at $d^8$ and hold it in its lifted position while the section placed upon the anvil is being serrated. $d'$ is a spring provided for drawing the said catch into proper engagement with the end of the lever. $d^2$ is a cam on the cam-wheel F, adapted to lift the lever D and relieve the pressure upon the catch. Adjacent to this cam is the projection $d^3$, which is adapted to engage the catch and move it from beneath the end of the lever D in order that the latter may fall and free the section just serrated. The lever is lifted slightly before the catch is removed only to avoid wear. In Fig. 10 a section is shown on the anvil in position to be serrated.

R is a pin adapted to slide freely through a hole in the anvil $D^8$ and the bed-plate S of the machine.

To the frame of the machine an elastic arm R' is pivoted. Upon the same pivot on the stud as one piece with the arm R' is secured an arm R², provided with an antifriction-roller R³. Upon the cam-wheel F is the cam R⁴, adapted to pass beneath the antifriction-roller R³ and lift the arm R², and consequently the arm R', and in turn slide the pin R upward. The arm R' is elastic in order that if there is a section in position for being serrated and the pin R strikes it the said arm will yield and avoid breakage; but if there is no section in position, the supply in the hopper having become exhausted, the pin may rise above the surface of the anvil and form a stop which prevents the slide C from moving the whole length of its stroke. The purpose of the pin R is, in short, to prevent the lever E from making a full stroke when moving in the direction of the hopper, and thus shortening the stroke of the lever is availed of to serve as a stop-motion to check the operation of the serrating-hammers. The fact is, in short, that when the lever E is given a full stroke the serrating-hammers are started at the proper interval to accomplish their object, and if it does not move the full distance of its stroke they are permitted to remain idle, as will hereinafter appear.

Coming now to the hammers and mechanism for controlling them, reference is had to Figs. 1 and 2. The serrating-hammers and means for actuating them are as shown in the patent granted to G. H. Simonds, No. 83,736, dated November 3, 1868, there being nothing new in their construction. They are only shown in general outlines in Figs. 1 and 2. In the upper surface of the table S are the curved slots $b^3$ and $b^4$. Into these slots, enlarged at their bottoms, are the heads of the bolts $k\ k$, which pass up through the hammer bed-plates H² and H³. The circular grooves in the upper surface of the table and the bolts through the hammer bed-plates H² and H³ permit of swinging them and the parts supporting the hammers, so that the tools secured in said hammers may be made to travel in any desired direction to conform to the angle of the sections being serrated. The hammer-carriages H and H' slide upon the hammer bed-plates in grooves, as shown in Fig. 13.

J and J' are screw-shafts journaled in the hammer-carriages H and H'. Upon the screw-shafts are the bevel-gears B' and B². These screw-shafts rotate continuously.

K and K' are half-nuts, their threads being adapted to engage those of the screw-shafts. They are pivoted at their lower ends, as indicated in Fig. 1, at $k'\ k^2$ beneath the shafts to the hammer-carriage bed-plates H² and H³. When the half-nuts are pressed against the screw-shafts, the shafts as they revolve are moved endwise, carrying with them the hammer-carriages H H'. When the half-nuts are disengaged from the screw-shafts, the hammer-carriages are drawn backward by the springs M and M'.

G³ and G⁴ are the helves of the hammers. They are pivoted upon the screws $g\ g'\ g^2\ g^3$. The chisel-like hammers G and G' are secured at their outreaching ends of the helves, and the short ends of the helves are struck by the tappets I and I', so as to give the chisel-like hammers a rapid vertical vibration. In order to arrest the stroke of each hammer at the instant its working upon the side of a section is completed, stops N N' are provided, (shown in Figs. 1 and 2,) which are forcibly moved on their pivots $l^4\ l^4$ under the helve of each hammer.

L and L' are levers pivoted at $l$ and $l'$, one end of each connected to one of the half-nuts K and K' and the other end connected to the stops N and N'. The result of so connecting these parts is that when either half-nut is engaged with the screw with which it coöperates the stops N and N' are removed from beneath the helve of the hammer, and when the half-nuts are disengaged the stops are swung under the helve of the hammers. Whether the hammers are working or not depends on the mechanism which actuates the levers L and L'.

$l^{14}$ and $l^{15}$ are arms formed as one piece with the last-mentioned levers.

O and O' are links which connect the arms $l^{14}$ and $l^{15}$ through indirect means with the levers P and P'. For the moment it is only necessary to consider that the movement of the connections O and O' in definite directions starts the hammers and moving them in reverse directions arrests said hammers.

P and P' are levers placed beneath the bed-plate S and adapted to move on vertical axes, so that their ends $p\ p'$ may be moved back and forth horizontally. Each of these levers is connected by the indirect mechanism referred to to the arms $l^{14}$ and $l^{15}$. The inner ends $p^2$ and $p^3$ of the levers lie immediately above the cam-wheels F and F', (see Figs. 7 and 8,) on which cam-wheels are circumferential waved flanges U, U', U², and U³. Upon the under side of these levers are the antifriction-rollers $a$ and $a'$.

It is usually necessary that the serrating-hammers do not operate simultaneously, only for the reason that they cannot work quite simultaneously upon the point of a small section. For this reason the two cams U, U', U², and U³ are placed differently on the cam-wheels F and F', so that the cams will move the levers P and P' at slightly different times. In short, the actions of the hammers are timed differently.

Because of the necessity of adjusting the machine for various sizes of sections and those having edges that differ in their angles the cam-actuating levers P and P' are connected to the half-nuts K and K' in the indirect manner shown in Fig. 1.

O² and O³ are sliding bars sustained in the guides W, W', W², and W³. Upon these bars, by means of set-screws, are connected the pieces $x\ x'\ x^2\ x^3$. Reaching from the pivot formed on the pieces $x'$ and $x^2$ to the ends of the arms $l^{14}$ and $l^{15}$ on the levers L and L' are the rods $o\ o'$. From the pieces $x$ and $x^3$, secured to the rods O² and O³, extend the connections O⁴ and O⁵ to the levers P and P'. These pieces $x$, $x'$, $x^2$, and $x^3$ are secured on rods O² and O³, preferably by ordinary set-screws, whereby they may be adjusted along the rods O³ and O² as desired. The necessity of this adjustment will be readily understood by reference to Fig. 2. Suppose that the hammer bed-plates H² and H³ be so moved as to make the angle of the line of travel of the hammers correspond with the angle of a section to be cut. By swinging them on the bed-plate of the machine the arm $l^{14}$ will be moved. In this event the pivot-piece to which O is connected will have to be moved along on the rod O². If the hammer bed-plate be moved to a considerable extent, the adjustment of the pivot-piece $x'$ upon the rod O² may not be sufficient. Hence the pivot-piece $x$ can be also moved on the rod. This indirect connection, which is substantially the same on the other side of the machine with respect to the parts O³, $x^2$, and $x^3$, is necessitated in the present machine to provide for ample adjustment and because of lack of room to make a more direct one. The connections between the half-nuts K and K' and the levers P and P' may be made in any suitable manner by persons wishing to avail themselves of my invention. The cams U, U', U², and U³ are depended upon not only to put the hammers in motion, but to cause them to traverse the edges of the section being operated upon, as will now be explained. The cam-wheels are rotated continuously by means of the screw F³, (see Fig. 4,) acting upon the worm-wheel F² upon the same shaft as that of the said cam-wheels, the screw being given rotation by the pulley B³. As the cam-wheels rotate continuously, means must be provided to cause the serrating-hammers to be actuated only intermittently. This is accomplished as best shown in Figs. 6, 7, and 8. The action of the pin R has been described as forming the stop to prevent the lever E from moving to the extreme of its throw when the sections in the hopper are exhausted. Referring to Figs. 7 and 8, it will be seen that there is supported in suitable bearings $t^2$ and $t^3$ upon the main bed-plate S a shaft $t'$. Reaching downward from the shaft is the arm $t^5$, and to this arm is connected the rod T⁵. Extending downwardly from this shaft are also the arms T⁴ and T⁶. The last-named arms are connected to the slides T' and T⁷ by the links T³ and T⁸. These slides move in a guideway formed in blocks, as T², under the bed-plate S. These slides are connected by the links T³ to the arms T⁴ and T⁶ upon the rock-shaft $t'$. Beside the lever E is a rod T⁵, connected to the arm $t^5$ of the shaft $t'$. Upon this rod is a collar $t^6$. Bearing in mind that the lever E is sometimes prevented from making its whole stroke in the direction of the hopper, it will readily be seen that if the swivel-piece T¹⁷ on the said lever, through which the rod $t^5$ passes, does not move far enough to strike the collar $t^6$ on the said rod the slide T' will be moved no farther than represented in Fig. 8. The inclined end of the slide T' lies immediately over the end of the lever P and a similar one over P'. The said levers are slotted, as shown in Fig. 7, and within the slots are the hinged blocks $a^2$ and $a^3$ on pivots $a^5$ and $a^6$. Upon a lower surface of these blocks, at the free end, are the antifriction-rollers $a$ and $a'$. In order to hold these rollers away from the cam-pieces on the cam-wheels, a spring, as $a^4$, is adapted to hold each one in the position shown in Fig. 8. If now it be supposed that the pin R be prevented from moving upward by the presence of sections upon the anvil D³, then the slide C, not striking the pin R, may be moved by the lever E to the full end of its throw and in this action a section be forced from the hopper. Moving at full stroke the swivel T¹⁷ on the arm E will strike the collar $t^6$ on the rod $t^5$ and move the inclined slide T' (see Fig. 8) in such a direction as to force the pivoted block having the roller $a$ downward, and hence the roller, into position to be engaged by the cam-rims U and U' on the cam-wheels. In order to connect the upper end of the lever E to the slide C, the former is so bent laterally at 45, Fig. 7, in the present instance as to place it immediately in line with the longitudinal center of said slide C in order that the latter may be moved without forcing it against the guiding side pieces. The screw-shafts J and J' are given rotation from the shaft B² (see Fig. 4) through the instrumentality of the following shafts and gearing.

B' is a vertical shaft suitably journaled in the framework of the machine. Upon its lower end is the bevel-gear $h^8$, adapted to mesh into the bevel-gear $h^9$ upon the shaft B².

$h^3$ is a shaft lying immediately beneath the bed-plate. Upon it is the bevel-gear $h^6$, adapted to mesh into that $h^7$ upon the upper end of shaft B'. At the other end of the shaft $h^3$ is the spur-gear $h^{11}$. Upon the shafts J and J' are the gears $h^2$ and $h'$. Connecting these two spur-gears is the intermediate gear $h^3$, journaled upon a suitable shaft in the main frame. In order that these gears may be protected from dirt and all danger be removed from contact with them, they are inclosed within housings H⁴ and H⁵. The shafts J and J' are splined in the gears $h'$ and slide back and forth through the latter as they are moved endwise with their carriages.

V' is a cam upon the cam-wheel F, provided for the purpose of ringing the signal-bell when the hopper is empty. Through the opening in the outthrown portion $d^7$ of the lever P (see Fig. 7) is a push-pin V, as shown in Fig. 12. This pin when the lever is not in action rests immediately below the electric push-button $v^2$. The bell may be of any kind, or it may be an ordinary bell rung by a stroke. It may, in fact, be rung by any moving part of the machine the scope movement of which differs when the hopper is empty from its movement when the sections are in the hopper.

The operation of my machine as a whole will be sufficiently understood from the explanation I have given of the operation of its details. As far as the general operation is concerned, it is sufficient to say that the attendant adjusts the hammer-carriages on the bed-plate so that the line of travel of the serrating-hammers shall correspond with the angle of the edges of the section D to be serrated. This adjustment is accomplished by loosening the bolts $k$ and swinging the carrige bed-pieces to place. As they are swung on the bed-plate the shafts $h^3$ move with them, of course, the bearings W and W' of said shaft being pivoted concentric with the shaft B', the pulley B³, driven by any suitable belt, is put in motion, and all the shafts are rotated. The slide C will be moved; but on account of the pin R being in its way the lever E cannot be moved so far as to force the block T' in position to force the antifriction-rollers to position to be engaged by the cams, the result being that the serrating-hammers will remain in waiting.

Aside from the specific forms of construction this application may be considered to be a grouping of different devices to accomplish the end sought. For instance, one of the elements of the claims may be considered to be mechanism for automatically moving the sections to the anvil, another mechanism for operating the hammers and causing them to traverse the edges of the section, and another one means for causing the various groups of mechanism to operate in proper time relative to other parts.

What I claim as my invention, and desire to secure by Letters Patent, is—

1. In a serrating-machine, the combination of a serrating-hammer, an anvil, mechanism for operating the hammer, a hopper for holding the sections, automatic mechanism for moving the sections from the hopper to the anvil, a clamp for holding the sections on the anvil while they are being serrated, and means for operating the clamp.

2. In a serrating-machine, the combination of a serrating-hammer, an anvil, mechanism for operating the hammer, a section-hopper, feeding mechanism for moving the sections from the hopper to the anvil, and a stop-motion under control of the sections to stop the feeding devices and cause the hammer to discontinue its action when the supply of sections in the hopper is exhausted.

3. In a serrating-machine, the combination of a serrating-hammer, an anvil, mechanism for operating the hammer, a section-hopper, feeding mechanism for moving the sections from the hopper to the anvil, and devices connected to the feeding mechanism to control the operation of the hammer.

4. In a serrating-machine, the combination of serrating-hammers, sliding carriages on which they are mounted, mechanism for operating the hammers, feeding devices for the sections to place them in position to be acted on by the hammers, and mechanism connected to the feeding devices to control the movement of the carriages and the action of the hammers.

5. In a serrating-machine, the combination of a pair of serrating-hammers, mechanism for operating said hammers and moving them progressively toward a common point, and mechanism for throwing one of the hammers out of operation before the others.

6. In a serrating-machine, an anvil, a jaw for holding the sections upon the said anvil while being serrated, a section-hopper, mechanism for moving the sections from the said hopper to the said anvil, and means common to said jaw and to said mechanism for moving the sections from the said hopper and operating the said jaw, all combined, substantially as described.

7. In a serrating-machine, an anvil, a section-hopper adjacent thereto, mechanism for moving the sections from the hopper to the said anvil, a jaw for holding the sections in position while being serrated, serrating-hammers and devices to cause said hammers to traverse the edges of the sections being held and means common to said mechanism and devices to cause each part to move at its proper interval, all combined, substantially as described.

8. In a serrating-machine, an anvil for sustaining the sections while being serrated, serrating-hammers adapted to operate upon the sections held upon the said anvil, a hopper adjacent to said anvil, a stop and means for moving the same to cause the hammers to discontinue their action when the supply of sections in the hopper is exhausted, all combined, substantially as described.

9. In a serrating-machine, an anvil, serrating-hammers, means for operating them, a hopper, feeding mechanism adapted to move the sections from the said hopper, a stop-motion adapted to be rendered inoperative by the presence of the supply of sections, in combination with cams as to operate said feeding mechanism, control the action of the said hammers and the said stop-motion at the proper intervals, substantially as described.

10. In a serrating-machine, a primary shaft, a cam-wheel connected thereto, serrating-hammers, connections between said shaft and hammers for operating them, and mechanism under the control of said cam-wheel for moving the hammers to traverse the edges of the section being acted upon.

11. In a serrating-machine, the cam-wheels, the serrating-hammers adapted to traverse the edges of sections being operated upon, an anvil upon which said sections rest while being operated upon, a supply-hopper for said sections, means for moving said sections from the said hopper to the said anvil, cams upon said cam-wheels, mechanism to cause said hammers to strike their blows and traverse the edges of said sections and means operated by said cam to actuate the feeding mechanism at the proper interval, relative to the action of the hammers, all combined, substantially as described.

12. In a serrating-machine, the combination of serrating-hammers, mechanism for operating said hammers and moving them progressively toward a common point and mechanism for starting one of the hammers before the other.

CHRIS BORG.

Witnesses:
MARVIN CRAMER,
JOHN F. STEWARD.